(No Model.)

T. T. DANIELS.
Corn Planter.

No. 233,999.  Patented Nov. 2, 1880.

WITNESSES:
Francis McArdle
C. Sedgwick

INVENTOR:
T. T. Daniels
BY Munn & Co
ATTORNEYS.

UNITED STATES PATENT OFFICE.

THEODORE T. DANIELS, OF MORRISON, ILLINOIS, ASSIGNOR TO HIMSELF, MARTIN V. AUSTIN, AND HENRY S. FERGUSON, OF SAME PLACE.

CORN-PLANTER.

SPECIFICATION forming part of Letters Patent No. 233,999, dated November 2, 1880.

Application filed July 24, 1880. (No model.)

*To all whom it may concern:*

Be it known that I, THEODORE T. DANIELS, of Morrison, in the county of Whitesides and State of Illinois, have invented a new and useful Improvement in Corn-Planters, of which the following is a specification.

My invention relates to an apparatus which may be attached to corn-planters of various descriptions for the purpose of opening furrows for the reception of the corn dropped from the seed-box.

The invention consists in the combination of the frame, the seed-boxes, the hangers, the revolving disks, the bent axle, the connecting-rods, the cross-bar, the slotted arms, the adjusting-bolts, and the supporting-wheels, as will be hereinafter fully described.

Figure 1:
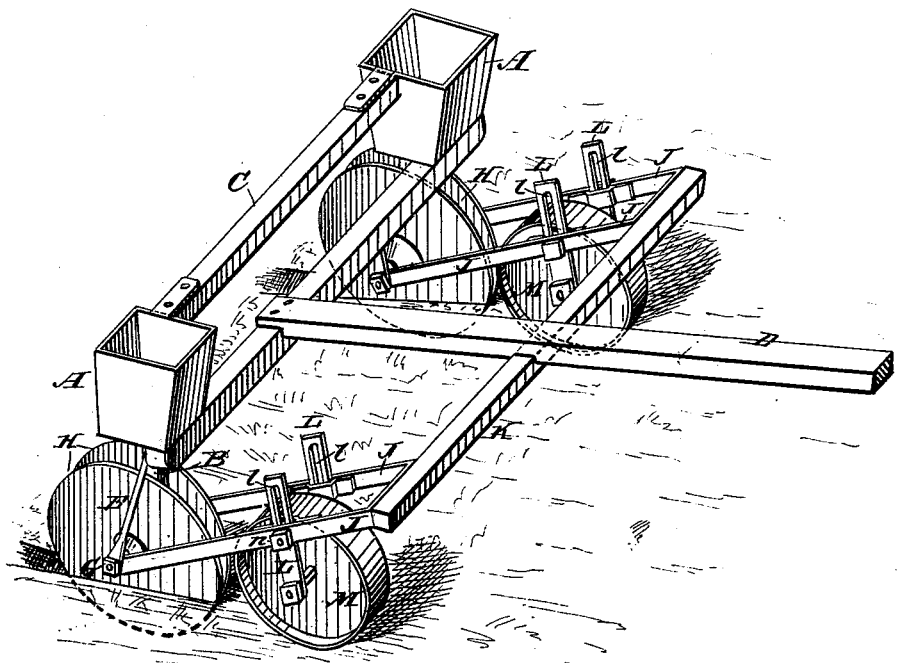
Figure 2:
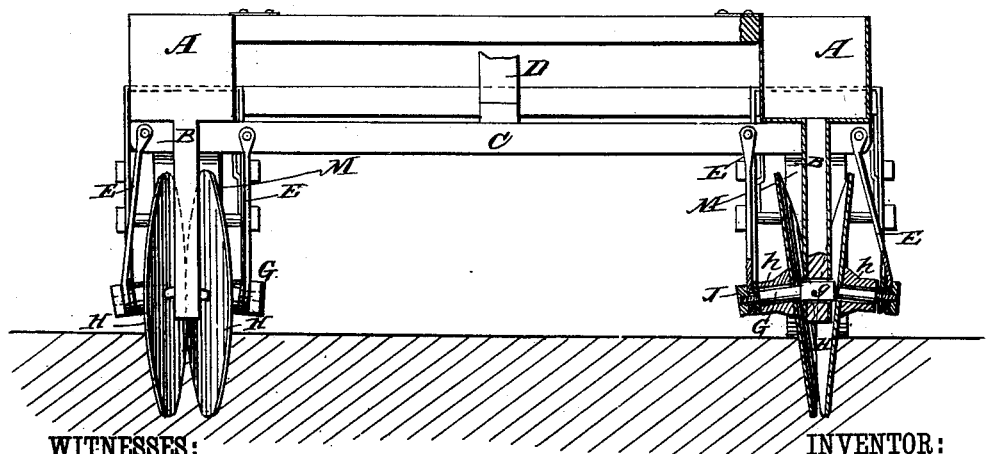

In the accompanying drawings, Figure 1 is a perspective view of an apparatus embodying my improvements. Fig. 2 is a rear view, partly in section.

Similar letters of reference indicate corresponding parts.

A A represent the seed-boxes, and B B the dropping-tubes, of a corn-planter of any suitable description. The boxes are carried by a frame, C, to which is attached the rear end of a pole or tongue, D.

To the rear side of the frame C are attached two pairs of hangers, E, one pair at each end, below the seed-boxes. The lower ends of each pair of hangers form bearings for the ends of an axle, G, which is bent midway of its length to form an approximate obtuse angle.

The colters H are provided with hubs *h*, which fit the axle G. Two colters are placed on each axle, one on each side of an abutment, *g*, located midway of the length of the axle.

The form of the axle is such that the peripheries of the two colters come together at one point, so that an edge view of them resembles the letter V, and these contiguous edges of the two colters form practically a wedge-shaped cutting-edge.

The ends of the axle are secured rigidly in place in the hangers by means of nuts, so that the axle cannot turn, and consequently the cutting-edge formed by the contiguous edges of the colters always occupies the same position, which position is diagonally forward and downward from the center of rotation.

As the machine moves forward the revolving colters open a furrow, and, as the dropping-tube B is located in the widest portion of the space between the colters, the corn is dropped into the furrow.

From the ends of each axle G two rods, J, extend forward to a cross-bar, K, to which their front ends are attached. The bar K lies parallel with the frame C, and has the tongue D attached to its mid-length. Each pair of bars J carries a wheel, M, the journals of which work in bearings at the lower ends of two arms, L. The upper portions of these arms are provided with slots *l*, and through each slot passes a bolt, *n*, which also passes through the rod J and is fastened by a nut. The wheels M thus arranged serve as gage-wheels to regulate the depth of the furrow made by the colters.

By loosening the nuts the wheels may be adjusted higher or lower with relation to the rods J, and thus the colters may be made to cut more or less deep, as desired.

I am aware that it is not broadly new to arrange two disks or conical seed-reservoirs upon a bent axle, so as to bring the edges of the said disks or reservoirs together at a point below the center of rotation; but

What I claim, and desire to secure by Letters Patent, is—

In a corn-planter, the combination of the frame C, the seed-boxes A, the hangers E, the disks H, the bent axle G, the rods J, the bar K, the slotted arms L, the bolts *n*, and the wheels M, substantially as herein shown and described, and for the purpose set forth.

THEODORE TITUS DANIELS.

Witnesses:
WM. J. MCCOY,
A. V. N. FRAZER.